US010165456B2

(12) United States Patent
Reial et al.

(10) Patent No.: US 10,165,456 B2
(45) Date of Patent: Dec. 25, 2018

(54) METHODS FOR TRANSMITTING MOBILITY SIGNALS AND RELATED NETWORK NODES AND WIRELESS DEVICES

(71) Applicant: Telefonaktiebolaget L M Ericsson (publ), Stockholm (SE)

(72) Inventors: Andres Reial, Malmo (SE); Andreas Cedergren, Bjarred (SE); Claes Tidestav, Balsta (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 14/441,211

(22) PCT Filed: Dec. 17, 2014

(86) PCT No.: PCT/EP2014/078235
§ 371 (c)(1),
(2) Date: May 7, 2015

(87) PCT Pub. No.: WO2016/095984
PCT Pub. Date: Jun. 23, 2016

(65) Prior Publication Data

US 2017/0142604 A1 May 18, 2017

(51) Int. Cl.
*H04W 36/08* (2009.01)
*H04B 5/00* (2006.01)
(Continued)

(52) U.S. Cl.
CPC .......... *H04W 24/08* (2013.01); *H04L 5/0094* (2013.01); *H04L 27/2611* (2013.01);
(Continued)

(58) Field of Classification Search
CPC ... H04W 72/04; H04W 36/08; H04W 72/046; H04W 16/28; H04W 24/08; H04W 24/10;
(Continued)

(56) References Cited

U.S. PATENT DOCUMENTS 8,897,702 B2 * 11/2014 Niu .................... H04W 48/16 455/41.1
9,450,661 B2 * 9/2016 Yu .................... H04B 7/0617
(Continued)

FOREIGN PATENT DOCUMENTS

EP 1545149 A2 6/2005
EP 1835774 A1 9/2007
(Continued)

OTHER PUBLICATIONS

PCT International Search Report, dated Aug. 21, 2015, in connection with International Application No. PCT/EP2014/078235, all pages.

(Continued)

*Primary Examiner* — Edan Orgad
*Assistant Examiner* — Vanneilian Lalchinthang
(74) *Attorney, Agent, or Firm* — Leffler Intellectual Property Law, PLLC

(57) ABSTRACT

This disclosure provides by a method for transmitting a mobility reference signal, MRS, during a mobility measurement session to a wireless device, WD. The method is performed in a radio access network node, RANN. The RANN is configurable to transmit using a set of transmission beams. The method comprises dynamically assigning, a MRS identifier to each candidate transmission beam in a set of candidate transmission beams. The method comprises transmitting control information to the WD, the control information comprising the MRS identifier for each corresponding candidate transmission beam; and transmitting the
(Continued)

mobility reference signal, MRS, to the WD in accordance with the transmitted control information.

19 Claims, 5 Drawing Sheets

(51) Int. Cl.

| | |
|---|---|
| ***H04B 7/00*** | (2006.01) |
| ***H04W 24/08*** | (2009.01) |
| ***H04L 5/00*** | (2006.01) |
| ***H04L 27/26*** | (2006.01) |
| ***H04W 36/00*** | (2009.01) |
| ***H04W 24/10*** | (2009.01) |
| ***H04W 72/04*** | (2009.01) |

(52) U.S. Cl.
CPC ....... *H04W 24/10* (2013.01); *H04W 36/0094* (2013.01); *H04W 72/042* (2013.01); *H04W 72/0413* (2013.01)

(58) Field of Classification Search
CPC .......... H04W 36/0094; H04W 72/0413; H04L 27/2611; H04L 5/0094; H04B 17/24; H04B 7/0408
USPC .......................................................... 370/252
See application file for complete search history.

(56) References Cited

U.S. PATENT DOCUMENTS

| | | | | |
|---|---|---|---|---|
| 9,780,933 | B2 | 10/2017 | Tsuboi et al. | |
| 2005/0037799 | A1 | 2/2005 | Braun et al. | |
| 2009/0111469 | A1 | 4/2009 | Lee et al. | |
| 2010/0029278 | A1 | 2/2010 | Fang et al. | |
| 2010/0127931 | A1 | 5/2010 | Rensburg et al. | |
| 2010/0303034 | A1 | 12/2010 | Chen et al. | |
| 2011/0110453 | A1* | 5/2011 | Prasad ................. | H04B 7/0695 375/285 |
| 2011/0134871 | A1 | 6/2011 | Nogami et al. | |
| 2011/0218016 | A1 | 9/2011 | Hirakawa et al. | |
| 2013/0051364 | A1* | 2/2013 | Seol ...................... | H04W 16/28 370/331 |
| 2013/0065612 | A1* | 3/2013 | Siomina ................ | H04W 24/10 455/456.2 |
| 2013/0155847 | A1 | 6/2013 | Li et al. | |
| 2013/0215857 | A1* | 8/2013 | Wu ..................... | H04W 52/143 370/329 |
| 2013/0272263 | A1* | 10/2013 | Pi ........................ | H04W 72/042 370/330 |
| 2014/0036809 | A1 | 2/2014 | Xu et al. | |
| 2014/0073329 | A1 | 3/2014 | Kang et al. | |
| 2014/0146788 | A1 | 5/2014 | Wallertin et al. | |
| 2014/0334566 | A1* | 11/2014 | Kim ..................... | H04B 7/0469 375/267 |
| 2015/0124732 | A1* | 5/2015 | Seo ....................... | H04L 5/0048 370/329 |
| 2015/0163687 | A1* | 6/2015 | Lee ....................... | H04W 24/10 370/252 |
| 2016/0150435 | A1 | 5/2016 | Baek et al. | |
| 2016/0197659 | A1* | 7/2016 | Yu ......................... | H04W 16/28 370/335 |
| 2017/0034742 | A1 | 2/2017 | Roa et al. | |
| 2017/0311195 | A1 | 10/2017 | Martin et al. | |
| 2017/0374574 | A1 | 12/2017 | Lee et al. | |
| 2018/0132204 | A1 | 5/2018 | Siomina et al. | |

FOREIGN PATENT DOCUMENTS

| | | | |
|---|---|---|---|
| WO | 200800134219 | A1 | 11/2008 |
| WO | 2010032791 | A1 | 3/2010 |
| WO | 2013006105 | A1 | 1/2013 |
| WO | 20130028128 | A1 | 2/2013 |
| WO | 2014010963 | A1 | 1/2014 |
| WO | 2015171166 | A1 | 11/2015 |
| WO | 2016003336 | A1 | 1/2016 |
| WO | 2016013698 | A1 | 1/2016 |
| WO | 2016045695 | A1 | 3/2016 |
| WO | 2016095984 | A1 | 6/2016 |

OTHER PUBLICATIONS

PCT Written Opinion, dated Aug. 21, 2015, in connection with International Application No. PCT/EP2014/078235, all pages.

Jihoon Lee et al., Dynamic Beamforming Handover Mechanism Using Neighbor Profile in IEEE 802.11 Wireless LANs, International Journal of Advancements in Computing Technology, vol. 5, No. 11, Jul. 2013, pp. 10-47.

Alcatel, 3GPP TSG RAN WG1 #36, R1-040195, Fast Beam Selection in Soft Handover, Malaga, Spain, Feb. 16-20, 2004, pp. 1-4.

PCT International Search Report, dated Jun. 17, 2015, in connection with International Application No. PCT/EP2014/070188, all pages.

PCT Written Opinion, dated Jun. 17, 2015, in connection with International Application No. PCT/EP2014/070188, all pages.

Non-Final Office Action dated Nov. 3, 2016 in connection with U.S. Appl. No. 14/769,799, 16 pages.

PCT International Search Report, dated Nov. 21, 2016, in connection with International Application No. PCT/EP2016/056500, all pages.

PCT Written Opinion, dated Nov. 21, 2016, in connection with International Application No. PCT/EP2016/056500, all pages.

Non-Final Office Action dated Jul. 20, 2018 in connection with U.S. Appl. No. 15/525,314, 34 pages.

Japanese Office Action, dated Jul. 27, 2018, in connection with Japanese Application No. 2017-530179, 4 pages.

English language summary of Japanese Office Action, dated Jul. 27, 2018, in connection with Japanese Application No. 2017-530179, 3 pages.

* cited by examiner

METHODS FOR TRANSMITTING MOBILITY SIGNALS AND RELATED NETWORK NODES AND WIRELESS DEVICES

TECHNICAL FIELD

The present disclosure relates to mobility measurements in a communication network and in particular to methods for transmitting mobility reference signals to a wireless devices, to related radio access network nodes, to related wireless devices and to related computer programs.

BACKGROUND

Handover is a vital part of any wireless or mobile communications network. A handover may be defined as the process of transferring an ongoing connection of a wireless device from one radio access network node (denoted as the serving radio access network node) to another radio access network node (denoted as the target radio access network node) in order to accomplish a seamless service over a large coverage area. The handover should be performed without any loss of data transmission to/from the wireless device and with as little interruption as possible for the wireless device.

To enable a handover, it is necessary to find a suitable target cell served by the target radio access network node, and to ensure that it is possible to sustain reliable communication to/from the wireless device in the target cell. Candidates for suitable target radio access network nodes (and/or target cells) are usually stored in so-called neighbor lists, which are stored at least at the serving radio access network node. To make sure that it is possible to sustain reliable communication to/from the wireless device in the target cell, the connection quality in the target cell needs to be estimated before the handover can be initiated.

The connection quality of the target cell is commonly estimated by measurements related to the wireless device. Downlink (DL, i.e., transmission from radio access network node to wireless device) and/or uplink (UL, i.e., transmission to radio access network node from wireless device) measurements may be considered. Relying solely on uplink measurements may not be sufficient, since the uplink connection quality can be different from the corresponding downlink connection quality. Therefore, handovers in cellular communications networks are commonly based on downlink measurements.

In existing cellular communications networks, all radio access network nodes (RANNs) continuously transmit pilot signals that wireless devices (WDs) in neighbor cells use to estimate the target cell quality. This is true in the Global System for Mobile Communications (GSM) where such pilot signals are transmitted on the broadcast control channel (BCCH), in the Universal Mobile Telecommunications System (UMTS) where such pilot signals are transmitted on the Common Pilot Channel (CPICH) and in the Long Term Evolution (LTE) telecommunications system where such pilot signals are transmitted as cell specific reference signals, as well as in Wi-Fi where such pilot signals are transmitted as beacons. This allows estimating the quality of neighbor cells with relatively good accuracy. The WDs perform measurements periodically and report the measurements to the network (i.e., the RANN). If it is detected that the serving cell quality approaches the candidate cell power, a more detailed measurement process or a handover procedure may be initiated. However, the signalling load from the RANN and the WD processing load depend on the number of candidate network nodes. Thus the signalling load from the RANN and the WD processing load may be significant for a large number of candidate network nodes.

Future cellular communications networks may use advanced antenna systems to a large extent. With such antennas, signals will be transmitted in narrow transmission beams to increase signal strength in some directions, and/or to reduce interference in other directions. When the antenna is used to increase coverage, handover may be carried out between transmission beams of the serving RANN or of the neighboring RANNs. The transmission beam through which the RANN is currently communicating with the WD is called the serving beam and the transmission beam it will hand over to, or switch to, is called the target beam. The potential target beams for which measurements are needed are called candidate beams.

Applying the principle of continuous transmission of pilot signals in all individual transmission beams in such a future cellular communications network may be convenient for WD measurements, and it may degrade the performance of the network. For example, continuous transmission of pilot signals in all individual transmission beams may consume resources available for data, and generate a lot of interference in neighboring cells, and higher power consumption of the RANNs.

US2013/0272263 discloses that time, frequency and spatial processing parameters for communications between a base station and a mobile station are selected by transmitting synchronization signals in multiple slices of a wireless transmission sector for the base station, and receiving feedback from the mobile station of at least one preferred slice of the multiple slices. In response to selection of one of the slices as an active slice for communications between the base station and the mobile station, reference signals are transmitted in the selected active slice using a corresponding selected precoder and/or codebook. The mobile station estimates and feeds back channel state information (CSI) based on those reference signals, and the CSI is then employed to determine communication parameters for communications between the base station and mobile station that are specific to the mobile station. The CSI-RS for different beams that are transmitted on the same time-frequency resources should be carefully chosen such that inter-beam interference is minimized. Additionally, different scrambling sequences or spreading sequences can be used for each beam such that inter-beam interference can be further suppressed.

US2013/0272263 relates to suppressing inter-beam interference at the WD when two CSI-RS are transmitted on the same time-frequency resource. US2013/0272263 is silent on the problem of resource usage and stacking of mobility signals during mobility measurement sessions initiated by the RANN. US2013/0272263 does not solve the issues of mobility between beams, of resource usage of mobility signals and of stacking of mobility signals.

Hence, there is a need for an improved mobility measurements session with minimized resource usage and reduced stacking of mobility signals.

SUMMARY

An object of the present disclosure is to provide methods, a radio access network node, and a wireless device which seeks to mitigate, alleviate, or eliminate one or more of the above-identified deficiencies in the art and disadvantages singly or in any combination.

This object is obtained by a method for transmitting a mobility reference signal, MRS, during a mobility measurement session to a wireless device, WD. The method is performed in a radio access network node, RANN. The RANN is configurable to transmit using a set of transmission beams. The method comprises dynamically assigning, a MRS identifier to each candidate transmission beam in a set of candidate transmission beams. The method comprises transmitting control information to the WD, the control information comprising the MRS identifier for each corresponding candidate transmission beam; and transmitting the mobility reference signal, MRS, to the WD in accordance with the transmitted control information.

Hereby, it is an advantage of the present disclosure that resource usage for mobility measurements is reduced, such as time and frequency resource usage, because only candidate transmission beams are advertised for in the control information to the WD, and the MRS identifier enables separating and detecting mobility signals in a resource element. Additionally, the present disclosure advantageously provides reduced transmission impairments and regulatory challenges from stacking several MRS sequences in the same resource field.

According to some aspects, a radio access network node, RANN, for transmitting a mobility reference signal, MRS, during a mobility measurement session to a wireless device, WD. The RANN is configurable to transmit using a set of transmission beams. The RANN comprises processing unit configured to dynamically assign a MRS identifier to each candidate transmission beam in a set of candidate transmission beams. The processing unit is configured to transmit control information to the WD, the control information comprising the MRS identifier for each corresponding candidate transmission beam; and transmit the mobility reference signal to the WD in accordance with the transmitted control information.

There is also disclosed herein a method, performed in a wireless device, for measuring a mobility reference signal transmitted by a radio access network node, RANN. The RANN is configurable to transmit using a set of transmission beams. The method comprises receiving, from the RANN, control information indicative of the mobility reference signal for a candidate transmission beam of a set of candidate transmission beams; and receiving, from the RANN, the mobility reference signal over the candidate transmission beam. The method comprises performing measurements of the mobility reference signal on the candidate transmission beam, using the received control information; and transmitting, to the RANN, a measurement report indicative of the performed measurement to the RANN.

This disclosure also relates to a wireless device for measuring a mobility reference signal transmitted by a radio access network node, RANN. The RANN is configurable to transmit using a set of transmission beams. The wireless device comprises processing unit configured to receive, from the RANN, control information indicative of the mobility reference signal for a candidate transmission beam of a set of candidate transmission beams; and receive, from the RANN, the mobility reference signal over the candidate transmission beam. The processing is configured to perform measurements of the mobility reference signal on the candidate transmission beam, using the received control information; and transmit, to the RANN, a measurement report indicative of the performed measurement.

It is an advantage of the present disclosure that the method performed in the WD and the WD provide a reduced MRS leakage and measurement errors on MRS at the WD. Furthermore, the present disclosure provides a reduced power consumption of the WD as measurements are required on MRS of candidate transmission beams (e.g. on fewer OFDM symbols).

Advantageously this disclosure improves network capacity, radio resource utilization, energy efficiency, and link performance for individual wireless devices.

In addition to the above method, there is also provided herein computer programs comprising computer program code which, when executed in a RANN, causes the RANN, to execute methods according to the present teaching.

The computer programs, the methods, provide advantages corresponding to the advantages already described in relation to the RANNs.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
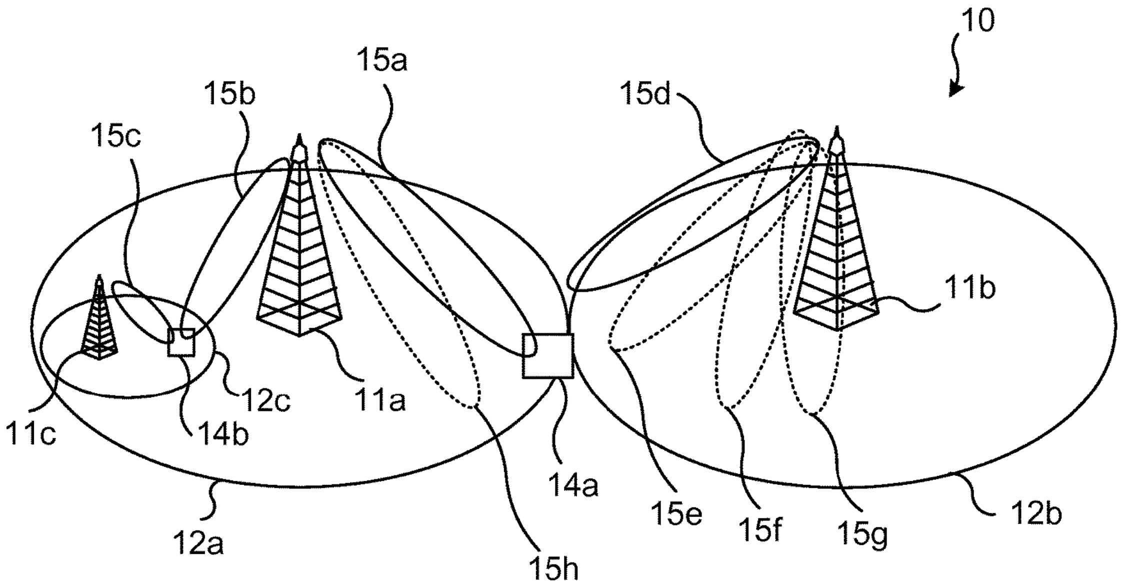
FIG. 1 is a schematic diagram illustrating an exemplary communication network according to some aspects of the present disclosure.

The present teaching relates to providing an efficient mobility measurement session, which reduces the resource usage and allows optimal detection of the mobility signals at the WD. The present technique is applicable to any network node as well as any wireless device in a wireless communication system.

To provide efficient mobility measurements in a wireless communication system using advanced antenna systems, a mobility reference signal MRS is transmitted by the RANN so as to enable the WD to detect and measure candidate beams at the WD. One approach is to dynamically activate a mobility reference signal, MRS, upon which a wireless device, WD, performs mobility measurements. In such approach, each time mobility measurements are required for a certain WD, a reasonable candidate beam set is determined and MRS are activated for the candidate beams of the candidate beam set. Beam IDs of the candidate beam of the candidate beam set are then signaled to the WD to limit WD measurements to these specific candidate beams. This requires that all beams from all nodes in the neighborhood are assigned a unique MRS each regardless whether they are currently candidate beams or not. Separation between MRSs may be achieved e.g. using multiplexing into different time-frequency fields and/or using code multiplexing using (near-)orthogonal sequences occupying the same time-frequency field. This results in a fixed 1-1 mapping or a fixed assignment between a candidate beam and a mobility signaling resource (such as beam_ID-to-MRS mapping). However, such approach is not scalable to dense network scenarios where a considerable number of beams is present in a neighborhood. Several problems arise when a total number of beams in the neighborhood is significant. Namely, resource utilization reserved for mobility increases with the number of beams in the neighborhood. To address this, a plurality of MRSs may be multiplexed or stacked on the same resource field. However, MRS stacking or multiplexing may lead to increased transmission impairments at the RANN and an increased local spectral density as well as to a degraded MRS detection performance at the WD and degraded accuracy of mobility measurements, e.g. due to lost orthogonality between the MRSs. Alternatively, to avoid an increased local spectral density, a per-beam MRS power may be reduced. However, this would lead to a reduced mobility signal coverage which is not desirable.

Thus, the present disclosure provides a technique using a dynamic assignment (such as a flexible mapping) of a MRS identifier to each candidate beam, where the MRS identifier may be indicative of a resource field allocated to the MRS, and of a sequence (such as a signature sequence). The technique disclosed herein provides that only the current candidate beams relevant for WD mobility measurements are assigned a unique MRS identifier. Since the amount of candidate beams for a WD is substantially less than the total amount of all beams from all nodes in the neighborhood, the resources used as well as the number of MRS stacked in each resource element are reduced. The present disclosure thereby avoids an extensive resource usage for mobility measurements while being scalable. The present disclosure provides a technique that minimizes the probability of stacking many MRS in the same resource field, which improves detection performance at the WD.

The RANN may comprise a circuit implementing the method disclosed herein. Such circuits are according to different aspects implemented as, e.g., application-specific integrated circuit (ASIC), field-programmable logic array (FPGA), or general purpose processor.

Aspects of the present disclosure will be described more fully hereinafter with reference to the accompanying drawings. The radio access network nodes, the wireless devices, and methods disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms “a”, “an” and “the” are intended to include the plural forms as well, unless the context clearly indicates otherwise.

FIG. 1 is a schematic diagram illustrating a communications network 10 where embodiments presented herein can be applied. The communications network 10 comprises radio access network nodes, RANNs 11*a*, 11*b* 11*c*. The RANNs may be any combination of radio base stations such as base transceiver stations, node Bs, and/or evolved node Bs. The RANNs may further be any combination of macro RANNs 11*a*, 11*b*, and micro, pico, or femto RANNs 11*c*. Each RANN 11*a*, 11*b*, 11*c* provides network coverage in a respective coverage region 12*a*, 12*b*, 12*c* by transmitting transmission beams 15*a*, 15*b*, 15*c*, 15*d*, 15*f*, 15*g*, 15*h* in that coverage region 12*a*, 12*b*, 12*c*. The RANN 11*a*, 11*b*, 11*c* is configurable to transmit using a set of transmission beams 15*a*, 15*b*, 15*c*, 15*d*, 15*e*, 15*f*, 15*g*. According to the illustrative example of FIG. 1 the RANN 11*a* is configurable to transmit using transmission beams 15*a*, 15*b*, 15*h*; the RANN 11*c* is configurable to transmit using transmission beam 15*c*; and the RANN 11*b* is configurable to transmit using transmission beams 15*d*, 15*e*, 15*f*, 15*g*. Each RANN 11*a*, 11*b*, 11*c* is assumed to be operatively connected to a core network (not illustrated). The core network may in turn be operatively connected to a service and data providing wide area network.

Hence, a wireless device 14*a*, 14*b* served by one of the RANNs 11*a*, 11*b*, 11*b* may thereby access services and data as provided by the wide area network. The wireless devices 14*a*, 14*b* may be any combination of mobile stations, mobile phones, handsets, wireless local loop phones, user equipment (UE), smartphones, laptop computers, and/or tablet computers.

A wireless device 14*a*, 14*b* may move or its serving cell performance may degrade, thus requiring handover of the wireless device 14*a*, 14*b* from one RANN to another RANN, or at least from one transmission beam to another transmission beam. As noted above, such handover should be performed without any loss of data transmission to/from the wireless device and with as little disruption as possible for the wireless device. The serving beam and the target beam may be transmission beams of the same or different RANN. Hence, the term handover as herein used should be interpreted as a handover from a serving beam to a target beam.

The herein disclosed embodiments relate to transmitting a mobility reference signal for mobility measurements enabled by a RANN and to be performed at a WD 14*a*, 14*b* based on e.g. the quality of the current downlink data channel to the WD 14*a*, 14*b*. Mobility reference signals may be activated in a candidate transmission beam of a set of candidate transmission beams including the serving transmission beam and/or possible target transmission beam(s). The WD 14*a*, 14*b* may be instructed to perform measurements on the mobility reference signals. The results of the measurements may then be reported to the RANN 11*a*, 11*b*, 11*c* and appropriate beam switching or cell handover operations may be performed. Also uplink measurements may be considered in the decision to activate downlink mobility pilot signals to further reduce the network load due to transmitted pilot signals. The embodiments disclosed herein particularly relate to transmitting a mobility reference signal to a wireless device 14*a*, 14*b* during a mobility measurement session. In order to perform such transmission, there is provided a RANN 11*a*, 11*b*, 11*c*, methods performed by the RANN 11*a*, 11*b*, 11*c*, and a computer program comprising code, for example in the form of a computer program product, that when run on a processing unit of the RANN 11*a*, 11*b*, 11*c*, causes the processing unit to perform the methods. There is also provided a WD 14*a*, 14*b*, and methods performed by the WD 14*a*, 14*b*.

Exemplary RANNs are presented in FIG. 2 and methods performed in the RANN are presented in FIG. 3*a*-*b* in detail below.

Figure 2:
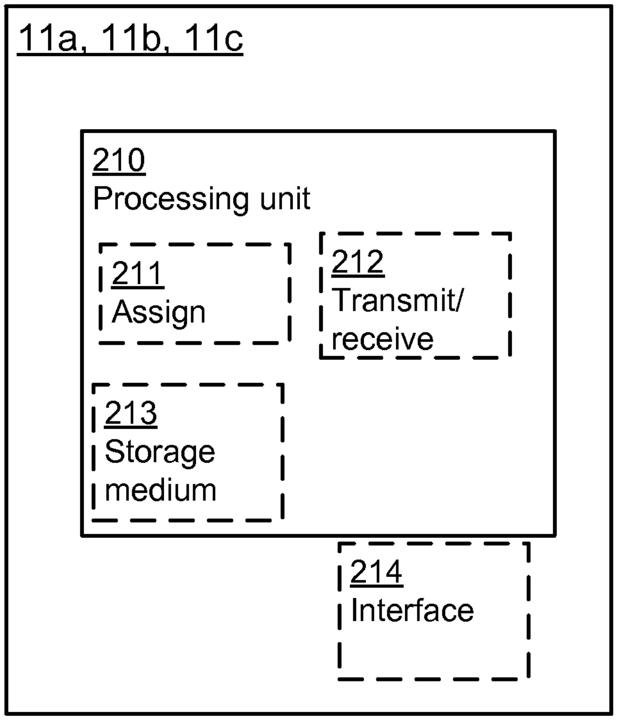
FIG. 2 is a block diagram illustrating an exemplary radio access network node according to some aspects of the present disclosure.

FIG. 2 schematically illustrates a block diagram of an exemplary RANN 11*a*, 11*b*, 11*c*. FIG. 2 shows a number of functional units or components of a RANN 11*a*, 11*b*, 11*c* according to some aspects. The RANN 11*a*, 11*b*, 11*c*, is configured to transmit a mobility reference signal, MRS, during a mobility measurement session to a wireless device, WD 14*a*, 14*b*. The RANN 11*a*, 11*b*, 11*c* is configurable to transmit using a set of transmission beams 15*a*, 15*b*, 15*c*, 15*d*, 15*e*, 15*f*, 15*g*, 15*h*. The RANN 11*a*, 11*b*, 11*c* comprises processing unit 210. The processing unit 210 is provided using any combination of one or more of a suitable central processing unit, CPU, multiprocessor, microcontroller, digital signal processor, DSP, application specific integrated circuit, ASIC, field programmable gate arrays, FPGA, etc., capable of executing software instructions stored in a computer program product, e.g. in the form of a storage medium 23. Thus the processing unit 210 is thereby arranged to execute methods as herein disclosed. The processing unit 210 is configured to dynamically assign a MRS identifier to each candidate transmission beam in a set of candidate transmission beams. Hence the processing unit 210 comprises e.g. an assign module 211. A MRS identifier comprises an attribute identifying the MRS e.g. a MRS index and indicating at least a resource element where the MRS transmission is allocated. The processing unit 210 is configured to transmit control information to the WD 14*a*, 14*b*, the control information comprising the MRS identifier for each corresponding candidate transmission beam, such as the control information comprising the MRS identifier assigned to each candidate transmission beam, such as the control information comprising a list of MRS identifiers wherein each MRS identifier is assigned to a corresponding transmission candidate beam. Hence the RANN 11*a*, 11*b*, 11*c* comprises e.g. an interface 214. The processing unit 210 comprises e.g. a transmit module 212. The transmit module 212 is e.g. connected to the interface 214. The processing unit 210 is configured to transmit the mobility reference signal to the WD 14*a*, 14*b* in accordance with the transmitted control information. The transmit module 212 is configured to transmit the mobility reference signal to the WD 14*a*, 14*b* over e.g. a control channel (such as a synchronization channel). The processing unit 210 comprises e.g. a storage medium 213 from which the processing unit is arranged to retrieve instructions as provided by any of the functional modules 211, 212 and to execute the instructions, and thereby performing any of the steps disclosed herein. The storage medium 213 may also comprise persistent storage, which, for example, can be any single one or combination of magnetic memory, optical memory, solid state memory or even remotely mounted memory. The interface 214 is e.g. configured for communications with another RANN 11*a*, 11*b*, 11*c*, a core network, and/or at least one wireless device 14*a*, 14*b*. As such the interface 214 comprises e.g. one or more transmitters and receivers, comprising analogue and digital components and a suitable number of antennas for radio communications and a suitable number of wired ports for wired communications. The processing unit 210 controls the general operation of the RANN 11*a*, 11*b*, 11*c* e.g. by sending data and control signals to the interface 214 and/or by retrieving data and instructions from the storage medium 213. Other components, as well as the related functionality, of the RANN 11*a*, 11*b*, 11*c* are omitted in order not to obscure the concepts presented herein.

According to some aspects, the RANN 11*a*, 11*b*, 11*c* is configured to receive from the WD 14*a*, 14*b* a measurement report indicative of the measurement of the corresponding MRS on the candidate beam. The processing unit 210 is e.g. configured to receive from the WD 14*a*, 14*b* a measurement report indicative of the measurement of the corresponding MRS on the candidate beam. The transmit module 212 is e.g. a transmit and/or receive module 212 to receive from the WD 14*a*, 14*b* a measurement report.

Figure 3A:
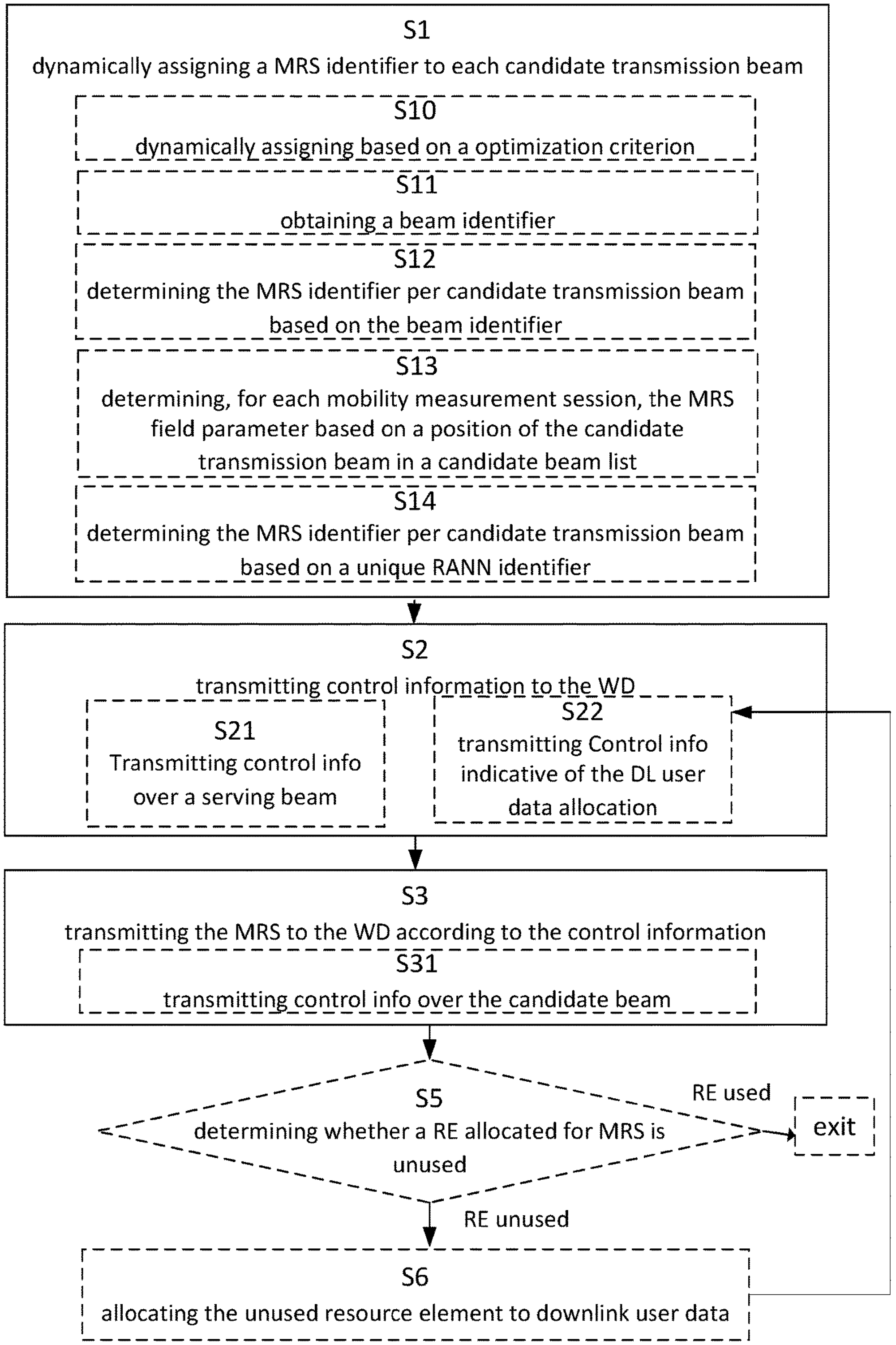
FIG. 3*a*-3*b* is a flowchart illustrating methods performed in a radio access network node according to some aspects of this disclosure.
Figure 3B:
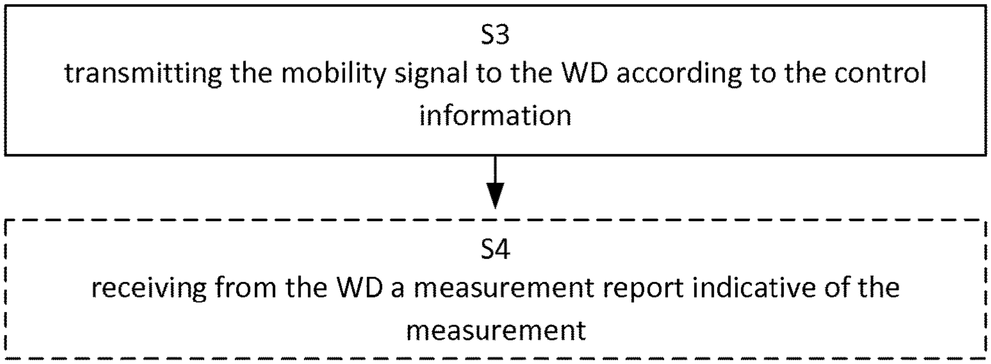

FIG. 3*a*-3*b* is a flowchart illustrating methods performed in a radio access network node according to some aspects of this disclosure. The methods are performed by the RANN 11*a*, 11*b*, 11*c*. FIG. 31 shows methods for transmitting a mobility reference signal during a mobility measurement session to a wireless device, WD, 14*a*, 14*b*. The RANN 11*a*, 11*b*, 11*c* is configured to, in step S1, dynamically assign, a MRS identifier to each candidate transmission beam in a set of candidate transmission beams. The RANN 11*a*, 11*b*, 11*c* assigns a MRS identifier to each candidate transmission beam in the set of candidate transmission beams e.g. at each mobility measurement session. The RANN 11*a*, 11*b*, 11*c* is configured to perform step S1 of dynamically assigning on a per-mobility measurement session basis. For example, when decision has been made that mobility measurements need to be performed and therefore MRS need to be activated, the RANN 11*a*, 11*b*, 11*c* obtains or generates a set of candidate transmission beams and then assigns a MRS identifier to each candidate transmission beam.

According to some aspects, the set of candidate transmission beams comprises a sub-set of the set of transmission beams 15*a*, 15*b*, 15*h* configured by a serving RANN 11*a* and/or a sub-set of a set of transmission beams 15*c*, 15*d*, 15*e*, 15*f*, 15*g* configured by one or more neighboring RANNs 11*b*, 11*c*. The serving RANN 11*a* transmits control information regarding candidate transmission beams including e.g. transmission beams of one or more neighboring RANNs 11*b*, 11*c*. This provides the advantage of minimizing the amount of control information sent to the WD in a neighborhood, as well as the resource used for sending such control information.

According to some aspects, the method further comprises, in step S10, dynamically assigning, a MRS identifier to each candidate transmission beam in a set of candidate transmission beams based on an optimization criterion. The optimization criterion comprises e.g. a resource usage metric, and/or a MRS stacking metric. In other words, the RANN 11*a*, 11*b*, 11*c* is 11*c* generates a MRS identifier and assigns it to each candidate transmission beam so as to minimize resource usage, and/or to minimize MRS stacking in the same resource element.

The method further comprises, in step S2, transmitting control information to the WD 14*a*, 14*b*. The control information comprises the MRS identifier for each corresponding candidate transmission beam. For example, the control information comprises the MRS identifier assigned to each candidate transmission beam, such as a list of MRS identifiers wherein each MRS identifier is assigned to a corresponding transmission candidate beam. Stated differently, the RANN 11*a*, 11*b*, 11*c* signals to the WD the upcoming MRS transmission, by providing control information to the WD that allows the WD to detect and measure the MRS on a candidate transmission beam. The control information comprises e.g. one or more MRS identifier assigned or corresponding to one or more candidate transmission beams of the set of candidate transmission beams. The MRS identifier is e.g. indicative of a MRS sequence parameter per candidate transmission beam and a MRS field parameter per candidate transmission beam. In other words, the MRS sequence parameter per candidate transmission beam and the MRS field parameter per candidate transmission beam is derivable at the WD from the MRS identifier. The WD configures e.g. its receiver according to the MRS sequence parameter per candidate transmission beam and the MRS field parameter per candidate transmission beam to perform measurements on a given candidate transmission beam. In one or more embodiments, the serving RANN signals control information comprising a list of MRS identifiers, each MRS identifier corresponding to a respective candidate transmission beam. This may be advantageous when a mapping between a beam identifier and MRS identifier changes at each mobility session, and is unknown to the WD.

According to some aspects, the MRS field parameter comprises a time-frequency resource field indicator. The MRS sequence parameter per candidate transmission beam enables e.g. detection of the MRS and/or separation of the MRSs stacked on the same resource element The method comprises transmitting the mobility reference signal, MRS, to the WD 14*a*, 14*b* in accordance with the transmitted control information In the next step, step S3, the RANN transmits the mobility reference signal, MRS, to the WD 14*a*, 14*b* in accordance with the transmitted control information. This implies that the RANN 11*a*, 11*b*, 11*c* transmits the MRS defined e.g. according to the MRS sequence indicated in the control information and e.g. in the resource element (e.g. time-frequency resource field) indicated in the control information. This may provide the advantage that measurements are to be performed only on set of candidate transmission beams which is a subset of the entire set of transmission beams present in the neighborhood.

In one or more embodiments, the control information is configured to enable a measurement of the corresponding MRS on the candidate beam at the WD 14*a*, 14*b*. The method disclosed herein comprises e.g. receiving S4 from the WD 14*a*, 14*b* a measurement report indicative of the measurement of the corresponding MRS on the candidate beam. The RANN 11*a*, 11*b*, 11*c* is configured to, in step S4, receive from the WD 14*a*, 14*b* a measurement report indicative of the measurement of the corresponding MRS on the candidate beam.

According to some aspects, the step S1 of dynamically assigning comprises obtaining S11, for each candidate transmission beam, a beam identifier; and determining S12 the MRS identifier per candidate transmission beam based on one or more beam identifiers. The RANN 11*a*, 11*b*, 11*c* is configured to, in step S11, obtain, for each candidate transmission beam, a beam identifier; and to determine in step S12 the MRS identifier per candidate transmission beam based on one or more beam identifiers. For example, the RANN 11*a*, 11*b*, 11*c* generates, receives, or retrieves from storage medium 213 a beam identifier for each candidate transmission beam, such as transmission beams of the set of transmission beams configurable by the RANN 11*a*, 11*b*, 11*c*.

In an illustrative example where the proposed technique is applicable, N resource elements (e.g. time-frequency T/F fields) are reserved for transmitting mobility reference signals for M candidate beams in a neighborhood of the RANN 11*a*, 11*b*, 11*c*. A set of candidate beams of the WD consists of K candidate beams at a mobility measurement session. Each field occupies a number of subcarriers in 1 OFDM symbol and a timing synchronization field is e.g. associated with each MRS field. The mobility measurement session presents K candidate beams with beam identifiers $b_0 \ldots b_{K-1}$ out of M beams present in the RANN neighborhood, where mobility reference signals are to be transmitted. It is provided L sequences available for MRS. Then the RANN 11*a*, 11*b*, 11*c* generates MRS identifier using e.g. the following expression:

$$\mathrm{MRSid}_k=\mathrm{mod}(b_k,NL) \tag{1a}$$

where $b_k$ denotes a beam identifier, N denotes a number of resource elements available, and L denotes the number of sequences available.

In one or more embodiments wherein, NL>=M, the mapping is e.g. simplified to:

$$\mathrm{MRSid}_k=b_k \tag{1}$$

Given the MRS identifier, the WD is capable of determining the MRS sequence parameter $\mathrm{MRSseq}_k$ and MRS field parameter $\mathrm{MRSfld}_k$ e.g. as follows:

$$\mathrm{MRSseq}_k=\lfloor \mathrm{MRSid}_k/N \rfloor \tag{2}$$

$$\mathrm{MRSfld}_k=\mathrm{mod}(\mathrm{MRSid}_k,N) \tag{3}$$

The RANN 11*a*, 11*b*, 11*c* assigns the MRS identifier to each candidate beam and signals it in control information to the WD, e.g. according to a signaling scheme. The RANN 11*a*, 11*b*, 11*c* transmits the mobility reference signals over the air to the WD. The MRS sequence parameter and the MRS field parameter assignment pattern is known to the WD which applies it to configure its receiver for mobility measurements, according to the correctly determined MRS sequence parameter sequence and the MRS field parameter.

According to some aspects of this disclosure, the RANN 11*a*, 11*b*, 11*c* is configured to perform step S1 of dynamically assigning on a per-mobility measurement session basis. The processing unit 210 is configured to dynamically assign a MRS identifier to each candidate transmission beam in a set of candidate transmission beams to obtain as even distribution or stacking over the resource elements as possible. The processing unit 210 computes e.g the MRS identifier in the following way:

$$\mathrm{MRSid}_k=\mathrm{mod}(k,NL) \tag{4}$$

where k denotes an index of a beam identifier (e.g. a beam index, k=0, . . . , K−1, in a list of K candidate beams), N denotes a number of resource elements available, and L denotes the number of sequences available. For example, when K<<NL, the MRS identifier is computed in the following way:

$$\mathrm{MRSid}_k=k \tag{5}$$

The RANN 11*a*, 11*b*, 11*c* sends control information comprising a MRS identifier $\mathrm{MRSid}_k$ for each candidate transmission beam. MRS sequence parameter and MRS field parameter can then be extracted at the WD from the MRS identifier as given above. In other words, the processing unit 210 assigns the available resource elements to MRSs a first time, then reiterates the filling over the same resource elements until the MRSs to be assigned are assigned. This may provide minimized MRS stacking in individual resource element. The present disclosure supports thus efficiently mobility measurement sessions where a significant number of MRSs are to be transmitted, excessive stacking may occur in some resource elements due to the instantaneous candidate beam ID combinations, and mobility measurement sessions where only a few spread-out resource elements are used.

According to some aspects, the RANN 11*a*, 11*b*, 11*c* is configured to dynamically assign a MRS identifier indicative of a resource element allocation to each candidate transmission beam based on a distribution sequence. The processing unit 210 is configured e.g. to assign a resource element to an MRS for each candidate transmission beam according to a distribution sequence. The distribution sequence is for example employed as $$\mathrm{MRSid}_k=Q(k) \tag{6}$$

where Q is a distribution sequence defined e.g. as $$Q=[0N2N \ldots (S-1)N1(N+1)(2N+1) \ldots ((S-1)N+1) \ldots SN] \tag{7}$$

Where N denotes a number of resource elements, and S denotes a maximum number of MRSs to be stacked at each resource element (e.g. a stacking height).

The distribution sequence can be seen as allocating a first resource element "N" (i.e. a T/F field for MRS) to S MRSs (e.g. S MRS sequences), then allocating the next field "N+1" to S MRSs (e.g. S MRS sequences), and continue allocation on the next resource element "N+2" until resource element "SN". The processing unit 210 is configured to signal the MRS identifier for each candidate transmission beam k, i.e. $MRSid_k$ to the WD, which can extract the relevant MRS sequence parameter and MRS field parameter according to a pre-determined mapping, such as Eq. (2)(3). In other words, the WD knows N via signalling or as specified in e.g. a standard protocol while the RANN is configured to signal the value of S chosen by the network but unknown to the WD. This disclosure allows the number of resource elements occupied by MRS signals to be minimized and compliant with a selected maximum MRS stacking height S. This may be useful if a size K of the set of candidate transmission beams in the current mobility session is smaller than a typical size Ktyp of a set of candidate transmission beams.

According to some aspects, the control information comprises a pair of the beam identifier and the MRS field parameter per candidate transmission beam, wherein the beam identifier is indicative of the MRS sequence parameter per candidate transmission beam. The serving RANN signals control information comprising e.g. a list of pairs {BeamID, MRSfld}. The WD extracts e.g. a corresponding MRS sequence parameter from each beam identifier BeamID. This may be advantageous e.g. when a beamID-to-MRSid mapping remains unchanged across sessions, and only the MRS field parameter is updated at each session. The WD can advantageously identify individual candidate beams from the same beam identifier across sessions.

In one or more embodiments, the beam identifier remains unchanged across mobility measurement sessions, and the RANN 11*a*, 11*b*, 11*c* is configured to, in step S13, determine, for each mobility measurement session, the MRS field parameter per candidate transmission beam based on a position of the candidate transmission beam in a candidate beam list. For example, a mapping between a candidate beam and a MRS sequence remains constant over sessions. The MRS field parameter is e.g. not determined based on a MRS identifier (and a beam identifier $b_k$). The RANN 11*a*, 11*b*, 11*c* is configured to the MRS field parameter per candidate transmission beam based on a position of the candidate transmission beam in a candidate beam list, such as on a parameter indexing the candidate transmission beam in a candidate beam list, e.g. as follows:

$$MRSid_k=b_k \quad (7)$$

The MRS identifier is indicative of the MRS field parameter per candidate transmission beam and the MRS sequence parameter per candidate transmission beam. For example, the MRS field parameter $MRSfld_k$ per candidate transmission beam and the MRS sequence parameter $MRSseq_k$ per candidate transmission beam are derivable from the MRS identifier as follows:

$$MRSseq_k=\lfloor MRSfld_k/N \rfloor \quad (8)$$

$$MRSfld_k=\mathrm{mod}(k,N) \quad (9)$$

In one or more embodiments, the control information comprises the respective MRS sequence parameter per candidate transmission beam $MRSseq_k$ (or $b_k$) and the MRS field parameter per candidate transmission beam $MRSfld_k$.

There may be different ways to determine a MRS identifier. Only examples are provided in this disclosure.

In one or more embodiments, the control information comprises the MRS field parameter per candidate transmission beam. Alternatively, the control information comprises e.g. the beam identifier per candidate transmission beam, and the MRS sequence parameter per candidate transmission beam.

According to some aspects, the step S1 of dynamically assigning comprises determining S14 the MRS identifier per candidate transmission beam based on a RANN identifier. The RANN 11*a*, 11*b*, 11*c* is configured to, in step S14, determine the MRS identifier per candidate transmission beam based on a RANN identifier. The RANN 11*a*, 11*b*, 11*c* generates e.g. the MRS identifier as follows, for NL>=M:

$$MRSid_k=k+AK\max \quad (10)$$

where A denotes a RANN identifier (e.g. a RANN index in the current RANN neighborhood), Kmax denotes a maximum candidate set size, k denotes an index of a beam identifier or a beam identifier. Kmax may preferably be a multiple of N.

The RANN 11*a*, 11*b*, 11*c* is configured to transmit the control information comprising the MRS identifier generated e.g. according to Eq. (10). The WD receiving the control information extracts e.g. the RANN identifier from the MRS identifier as follows:

$$A_k=\lfloor MRSind_k/K\max \rfloor \quad (11)$$

This is for example applicable for usual scenarios where AmaxKmax<NL. This disclosure allows e.g. the WD to reuse previously acquired RANN-specific timing and frequency synchronization parameters by detecting the RANN identifier.

According to some aspects, the method disclosed herein comprises determining S5 whether a resource element allocated for the MRS is unused. When it is determined that the resource element allocated for the MRS is unused, then the method disclosed herein comprises allocating S6 the unused resource element to downlink user data; and transmitting S22 to the WD 14*a*, 14*b* control information indicative of the downlink user data allocation. The RANN 11*a*, 11*b*, 11*c* is configured to, in step S5, determine whether a resource element allocated for the MRS is unused. When the RANN determines that the resource element allocated for the MRS is unused, the RANN 11*a*, 11*b*, 11*c* is configured to, in step S6, allocate the unused resource element to downlink user data, and to, in step S22, transmit to the WD 14*a*, 14*b* control information indicative of the downlink user data allocation. For example, the RANN takes into account DL data scheduling during mobility sub-frames when allocating a resource element (e.g. T/F resource) for MRS allocation during a mobility measurement session. For example, if resource blocks reserved for MRS are not utilized, the RANN uses those resource blocks for data. In other words, the RANN applies e.g. a flexible rate matching that it signals to the WD in the DL control channel so the WD is able to apply corresponding rate de-matching.

In one or more embodiments, transmitting S2 control information to the WD 14*a*, 14*b* comprises transmitting S21 the control information to the WD 14*a*, 14*b* over a serving transmission beam.

In one or more embodiments, transmitting S3 the MRS to the WD 14*a*, 14*b* in accordance with the transmitted control information comprises transmitting S31 the MRS to the WD 14*a*, 14*b* over the candidate transmission beam.

In one or more embodiments, each transmission beam in the set of transmission beams or each candidate transmission beam corresponds to a cell, a sector, a relay, and/or an access point.

The disclosed methods may be performed at each RANN (e.g. each candidate RANN), or jointly over candidate RANNs in a neighborhood. In a synchronized network, performing the disclosed methods jointly may further facilitate resource usage reduction, processing complexity reduction and/or measurement quality improvement.

Figure 4:
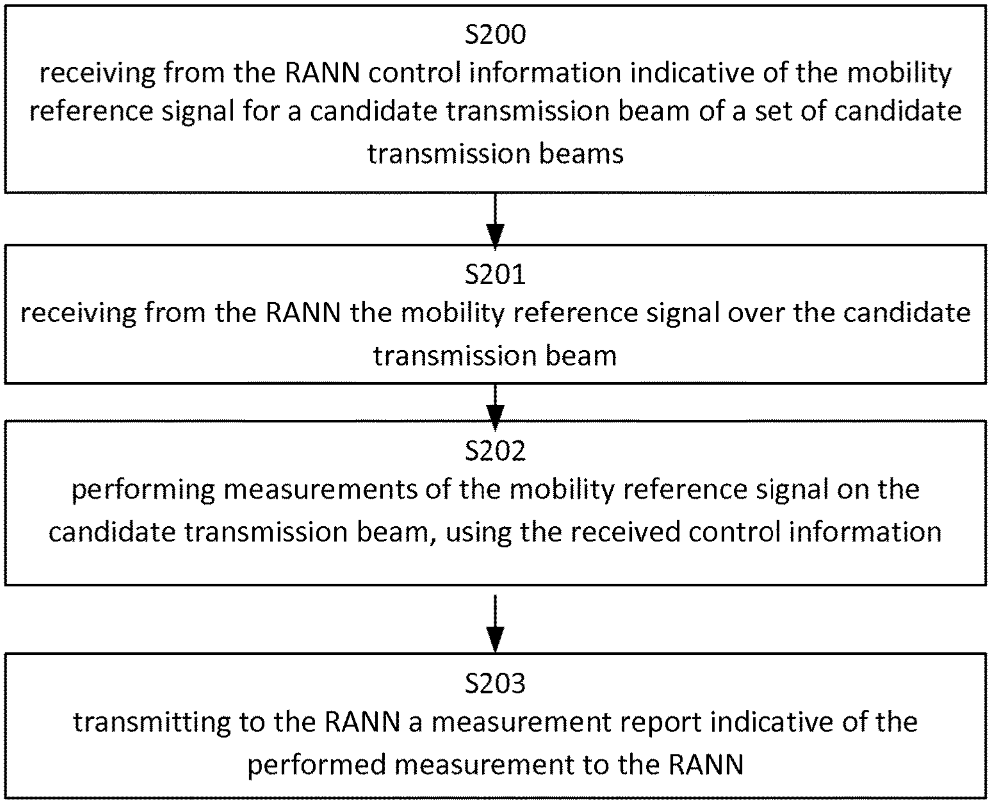
FIG. 4 is a flowchart illustrating methods performed in a wireless according to some aspects of this disclosure.

FIG. 4 is a flowchart illustrating methods performed in a wireless according to some aspects of this disclosure. The method is performed in a wireless device, 14*a*, 14*b*, for measuring a mobility reference signal transmitted by a radio access network node, RANN 11*a*, 11*b*, 11*c*. The RANN is configurable to transmit using a set of transmission beams. The wireless device, 14*a*, 14*b* receives S200, from the RANN 11*a*, 11*b*, 11*c*, control information indicative of the mobility reference signal for a candidate transmission beam of a set of candidate transmission beams. The control information comprises a MRS identifier. The wireless device, 14*a*, 14*b* derives e.g. from the control information, e.g. from each MRS identifier, a MRS field parameter and an MRS sequence parameter indicative of the MRS to be received. The wireless device, 14*a*, 14*b* configures its interface 514 according to the control information. The wireless device, 14*a*, 14*b* receives S201, from the RANN 11*a*, 11*b*, 11*c*, the mobility reference signal over the candidate transmission beam. The wireless device, 14*a*, 14*b* performs measurements S202 of the mobility reference signal on the candidate transmission beam, using the received control information; and transmits S203, to the RANN 11*a*, 11*b*, 11*c*, a measurement report indicative of the performed measurement to the RANN 11*a*, 11*b*, 11*c*.

Figure 5:
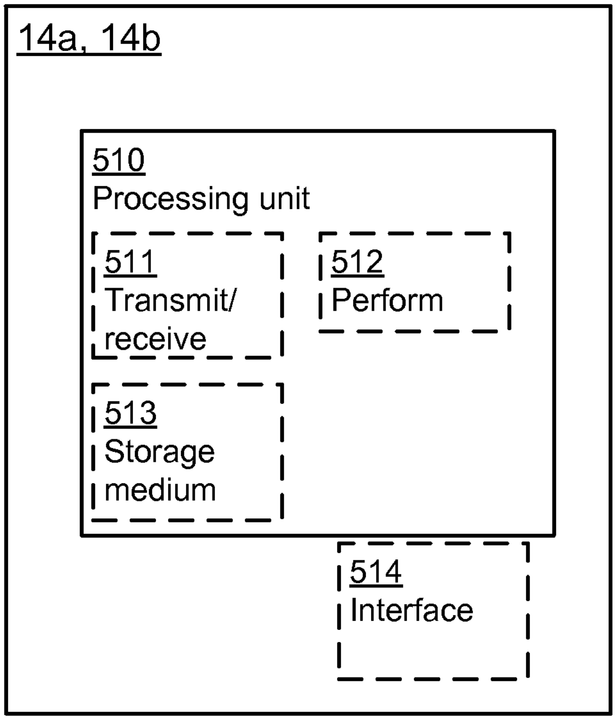
FIG. 5 is a block diagram illustrating an exemplary wireless device according to some aspects of the present disclosure.

FIG. 5 is a block diagram illustrating an exemplary wireless device 14*a*, 14*b* according to some aspects of the present disclosure. The wireless device 14*a*, 14*b* is configured to measure a mobility reference signal transmitted by a radio access network node, RANN 11*a*, 11*b*, 11*c*, the RANN being configurable to transmit using a set of transmission beams. The wireless device 14*a*, 14*b* comprises processing unit 510 configured to receive, from the RANN 11*a*, 11*b*, 11*c*, control information indicative of the mobility reference signal for a candidate transmission beam of a set of candidate transmission beams and to receive, from the RANN 11*a*, 11*b*, 11*c*, the mobility reference signal over the candidate transmission beam. Hence the processing unit 510 comprises e.g. a transmit/receive unit 511. The processing unit 510 is configured to perform measurements of the mobility reference signal on the candidate transmission beam, using the received control information; and to transmit, to the RANN 11*a*, 11*b*, 11*c*, a measurement report indicative of the performed measurement to the RANN 11*a*, 11*b*, 11*c*. Hence the processing unit 510 comprises e.g. a perform unit 512. The processing unit 510 comprises e.g. a storage medium 513 from which the processing unit 510 is arranged to retrieve instructions as provided by any of the functional modules 511, 512 and to execute the instructions, and thereby performing any of the steps disclosed herein at the WD. The storage medium 513 may also comprise persistent storage, which, for example, can be any single one or combination of magnetic memory, optical memory, solid state memory or even remotely mounted memory.

In one or more embodiments, the WD determines based on MRS identifier signaled from the RANN, a subset of resource elements (e.g. OFDM symbols) that are to be processed and applies micro-sleep during the rest of the sub-frames.

It should be appreciated that FIG. 1-5 comprises some modules or operations which are illustrated with a darker border and some modules or operations which are illustrated with a dashed border. The modules or operations which are comprised in a darker border are modules or operations which are comprised in the broadest example embodiment. The modules or operations which are comprised in a dashed border are example embodiments which may be comprised in, or a part of, or are further modules or operations which may be taken in addition to the modules or operations of the darker border example embodiments. It should be appreciated that these operations need not be performed in order. Furthermore, it should be appreciated that not all of the operations need to be performed. The example operations may be performed in any order and in any combination.

It should be appreciated that the example operations of FIG. 3*a-b*; FIG. 4 may be performed simultaneously for any number of RANNs or WDs.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method for transmitting a mobility reference signal (MRS) during a mobility measurement session to a wireless device (WD), the method being performed in a radio access network node (RANN), the RANN being configurable to transmit using a set of transmission beams, the method comprising:

dynamically assigning, on a per-mobility measurement session basis, a MRS identifier to each candidate transmission beam in a set of candidate transmission beams, wherein the MRS identifier is indicative of a MRS sequence parameter per candidate transmission beam and a MRS field parameter per candidate transmission beam, wherein the MRS field parameter comprises a time-frequency resource field indicator and the MRS sequence parameter per candidate transmission beam enables one or more of detection of the MRS and separation of a plurality of MRSs stacked on a same resource element and wherein the MRS sequence parameter and MRS field parameter are indicative of how the WD should configure a WD receiver in order to perform measurements on a given candidate transmission beam;

transmitting control information to the WD, the control information comprising the MRS identifier for each corresponding candidate transmission beam; and transmitting the mobility reference signal (MRS) to the WD in accordance with the transmitted control information.

2. The method according to claim 1, wherein the dynamically assigning comprises dynamically assigning the MRS identifier to each candidate transmission beam of the set of candidate transmission beams based on an optimization criterion.

3. The method according to claim 2, wherein the optimization criterion comprises at least one of a resource usage metric and a MRS stacking metric.

4. The method according to claim 1, wherein the set of candidate transmission beams comprises at least one of a sub-set of a set of transmission beams configured by a serving RANN and a sub-set of a set of transmission beams configured by one or more neighboring RANNs.

5. The method according to claim 1, wherein the dynamically assigning comprises:

obtaining, for each candidate transmission beam, a beam identifier; and determining the MRS identifier per candidate transmission beam based on one or more beam identifiers.

6. The method according to claim 1, wherein the control information comprises a pair of the beam identifier and the MRS field parameter per candidate transmission beam, wherein the beam identifier is indicative of the MRS sequence parameter per candidate transmission beam.

7. The method according to claim 6, wherein the beam identifier remains unchanged across mobility measurement sessions, and wherein the dynamically assigning comprises:

determining, for each mobility measurement session, the MRS field parameter per candidate transmission beam based on a position of the candidate transmission beam in a candidate beam list.

8. The method according to claim 6, wherein the control information comprises the MRS field parameter per candidate transmission beam, or the beam identifier per candidate transmission beam, and the MRS sequence parameter per candidate transmission beam.

9. The method according to claim 1, wherein the dynamically assigning comprises determining the MRS identifier per candidate transmission beam based on a RANN identifier.

10. The method according to claim 1, the method comprising:

determining whether a resource element allocated for the MRS is unused, and when it is determined that the resource element allocated for the MRS is unused, then:

allocating the unused resource element to downlink user data; and transmitting to the WD control information indicative of the downlink user data allocation.

11. The method according to claim 1, wherein the control information is configured to enable a measurement of the corresponding MRS on the candidate beam at the WD.

12. The method according to claim 1, the method further comprising receiving from the WD a measurement report indicative of the measurement of the corresponding MRS on the candidate beam.

13. The method according to claim 1, wherein transmitting control information to the WD comprises transmitting the control information to the WD over a serving transmission beam.

14. The method according to claim 1, wherein transmitting the MRS to the WD in accordance with the transmitted control information comprises transmitting the MRS to the WD over the candidate transmission beam.

15. The method according to claim 1, wherein each transmission beam in the set of transmission beams or each candidate transmission beam corresponds to at least one of a cell, a sector, a relay, and an access point.

16. A radio access network node (RANN), for transmitting a mobility reference signal (MRS) during a mobility measurement session to a wireless device (WD), the RANN being configurable to transmit using a set of transmission beams, the RANN comprising a processor configured to:

dynamically assign, on a per-mobility measurement session basis, a MRS identifier to each candidate transmission beam in a set of candidate transmission beams, wherein the MRS identifier is indicative of a MRS sequence parameter per candidate transmission beam and a MRS field parameter per candidate transmission beam, wherein the MRS field parameter comprises a time-frequency resource field indicator and the MRS sequence parameter per candidate transmission beam enables one or more of detection of the MRS and separation of a plurality of MRSs stacked on a same resource element and wherein the MRS sequence parameter and MRS field parameter are indicative of how the WD should configure a WD receiver in order to perform measurements on a given candidate transmission beam;

transmit control information to the WD, the control information comprising the MRS identifier for each corresponding candidate transmission beam; and transmit the mobility reference signal (MRS) to the WD in accordance with the transmitted control information.

17. A method, performed in a wireless device, for measuring a mobility reference signal (MRS) transmitted by a radio access network node (RANN), the RANN being configurable to transmit using a set of transmission beams, the method comprising:

receiving, from the RANN, control information indicative of the mobility reference signal for a candidate transmission beam of a set of candidate transmission beams on a per-mobility measurement session basis, wherein the control information comprises a MRS identifier, and wherein the MRS identifier is indicative of a MRS sequence parameter per candidate transmission beam and a MRS field parameter per candidate transmission beam, wherein the MRS field parameter comprises a time-frequency resource field indicator and the MRS sequence parameter per candidate transmission beam enables one or more of detection of the MRS and separation of a plurality of MRSs stacked on a same resource element;

receiving, from the RANN, the mobility reference signal over the candidate transmission beam;

configuring a receiver of the WD based on the MRS sequence parameter and MRS field parameter to perform measurements on a given candidate transmission beam;

performing measurements of the mobility reference signal on the candidate transmission beam, using the received control information; and transmitting, to the RANN, a measurement report indicative of the performed measurement to the RANN.

18. A wireless device for measuring a mobility reference signal (MRS) transmitted by a radio access network node (RANN), the RANN being configurable to transmit using a set of transmission beams, the wireless device comprising a processor configured to:

receive, from the RANN, control information indicative of the mobility reference signal for a candidate transmission beam of a set of candidate transmission beams on a per-mobility measurement session basis, wherein the control information comprises a MRS identifier, and wherein the MRS identifier is indicative of a MRS sequence parameter per candidate transmission beam and a MRS field parameter per candidate transmission beam, wherein the MRS field parameter comprises a time-frequency resource field indicator and the MRS sequence parameter per candidate transmission beam enables one or more of detection of the MRS and separation of a plurality of MRSs stacked on a same resource element;

receive, from the RANN, the mobility reference signal over the candidate transmission beam;

configure a receiver of the WD based on the MRS sequence parameter and MRS field parameter to perform measurements on a given candidate transmission beam;

perform measurements of the mobility reference signal on the candidate transmission beam, using the received control information; and transmit, to the RANN, a measurement report indicative of the performed measurement to the RANN.

19. A non-transitory processor readable storage medium comprising a computer program for transmission of mobility reference signals to a wireless device, the computer program comprising computer program code which, when run on a processing unit of a radio access network node (RANN), configurable to transmit using a set of transmission beams, causes the processing unit to perform a method for transmitting a mobility reference signal (MRS) during a mobility measurement session to a wireless device (WD), the method being performed in a RANN, the RANN being configurable to transmit using a set of transmission beams, the method comprising:

dynamically assigning, on a per-mobility measurement session basis, a MRS identifier to each candidate transmission beam in a set of candidate transmission beams, wherein the MRS identifier is indicative of a MRS sequence parameter per candidate transmission beam and a MRS field parameter per candidate transmission beam, wherein the MRS field parameter comprises a time-frequency resource field indicator and the MRS sequence parameter per candidate transmission beam enables one or more of detection of the MRS and separation of a plurality of MRSs stacked on a same resource element and wherein the MRS sequence parameter and MRS field parameter are indicative of how the WD should configure a WD receiver in order to perform measurements on a given candidate transmission beam;

transmitting control information to the WD, the control information comprising the MRS identifier for each corresponding candidate transmission beam; and transmitting the mobility reference signal (MRS) to the WD in accordance with the transmitted control information.

* * * * *

UNITED STATES PATENT AND TRADEMARK OFFICE

CERTIFICATE OF CORRECTION

PATENT NO. : 10,165,456 B2
APPLICATION NO. : 14/441211
DATED : December 25, 2018
INVENTOR(S) : Reial et al.

It is certified that error appears in the above-identified patent and that said Letters Patent is hereby corrected as shown below:

On the Title Page

In Item (72), under "Inventors", in Column 1, Line 1, delete "Malmo (SE);" and insert -- Malmö (SE); --, therefor.

In Item (72), under "Inventors", in Column 1, Line 2, delete "Bjarred (SE);" and insert -- Bjärred (SE); --, therefor.

In Item (72), under "Inventors", in Column 1, Line 3, delete "Balsta (SE)" and insert -- Bålsta (SE) --, therefor.

In Item (57), under "ABSTRACT", in Column 2, Line 1, delete "provides by a" and insert -- provides a --.

In the Drawings

In Fig. 3a, Sheet 3 of 5, in Step "S10", Line 1, delete "a optimization" and insert -- an optimization --, therefor.

In the Specification

In Column 4, Line 30, delete "FIG. 3a-3b is a flowchart" and insert -- FIGS. 3a-3b are flowcharts --, therefor.

In Column 4, Line 34, delete "wireless according" and insert -- wireless device according --, therefor.

In Column 5, Lines 38-39, delete "field-programmable logic array (FPGA)," and insert -- field-programmable gate array (FPGA), --, therefor.

In Column 5, Line 55, delete "11b 11c." and insert -- 11b, 11c. --, therefor.

Signed and Sealed this
Thirteenth Day of August, 2019

Andrei Iancu
*Director of the United States Patent and Trademark Office*

In Column 6, Line 9, delete "11b, 11b" and insert -- 11b, 11c --, therefor.

In Column 6, Line 54, delete "FIG. 3a-b" and insert -- FIGS. 3a-b --, therefor.

In Column 7, Line 62, delete "FIG. 3a-3b is a flowchart" and insert -- FIGS. 3a-3b are flowcharts --, therefor.

In Column 7, Line 65, delete "FIG. 31" and insert -- FIG. 3 --, therefor.

In Column 8, Line 32, delete "11c is 11c generates" and insert -- 11c generates --, therefor.

In Column 9, Lines 55-56, delete "provided L" and insert -- provided with L --, therefor.

In Column 11, Line 58, delete "$\mathrm{MRSseq}_k=\lfloor \mathrm{MRSfld}_k/N \rfloor$" and insert -- $MRSseq_k = \lfloor MRSid_k/N \rfloor$--, therefor.

In Column 13, Line 12, delete "wireless according" and insert -- wireless device according --, therefor.

In Column 14, Line 4, delete "FIG. 1-5" and insert -- FIGS. 1-5 --, therefor.

In Column 14, Line 20, delete "FIG. 3a-b;" and insert -- FIGS. 3a-b; --, therefor.